United States Patent
Kim et al.

(10) Patent No.: US 8,307,365 B2
(45) Date of Patent: Nov. 6, 2012

(54) APPARATUS AND METHOD FOR MANAGING EXECUTION OF ACTIVEX CONTROL

(75) Inventors: Su Yong Kim, Taejon (KR); Soonjwa Hong, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 1264 days.

(21) Appl. No.: 11/873,578

(22) Filed: Oct. 17, 2007

(65) Prior Publication Data

US 2008/0115133 A1    May 15, 2008

(30) Foreign Application Priority Data

Nov. 13, 2006  (KR) ................. 10-2006-0111854
Aug. 3, 2007   (KR) ................. 10-2007-0077984

(51) Int. Cl.
*G06F 9/46* (2006.01)
*G06F 15/16* (2006.01)

(52) U.S. Cl. ......... 718/101; 719/329; 709/218; 709/219

(58) Field of Classification Search ................. None
See application file for complete search history.

(56) References Cited

U.S. PATENT DOCUMENTS

| | | | |
|---|---|---|---|
| 7,490,332 B2 * | 2/2009 | Sesma | 719/315 |
| 2006/0059346 A1 * | 3/2006 | Sherman et al. | 713/175 |
| 2006/0075033 A1 * | 4/2006 | Bienstock et al. | 709/206 |
| 2007/0233807 A1 * | 10/2007 | Nix et al. | 709/217 |

* cited by examiner

*Primary Examiner* — Camquy Truong
(74) *Attorney, Agent, or Firm* — Rabin & Berdo, P.C.

(57) ABSTRACT

An apparatus and method for managing the execution of ActiveX control are provided. The apparatus includes a server list managing module for managing an approved server list for allowing the execution of predetermined ActiveX control and a disapproved server list for disallowing the execution of predetermined ActiveX control, an API hooking module for detecting installation or execution of ActiveX control in a HTML (Hyper Text Markup Language) document while visiting a web site, and a process module for reading the approved and disapproved server lists if the API hooking module detects the execution of the ActiveX control, allowing the execution of each ActiveX control only within approved web sites, and interrupting the execution of ActiveX control in disapproved web sites.

9 Claims, 2 Drawing Sheets

APPARATUS AND METHOD FOR MANAGING EXECUTION OF ACTIVEX CONTROL

BACKGROUND OF THE INVENTION

1. Field of the Invention

The present invention relates to ActiveX control, and more particularly, to an apparatus and method for managing the execution of ActiveX control in order to prevent the resources of a client system from illegally accessing by a malicious user although ActiveX control contains a security problem.

2. Description of the Related Art

Recently, various web based services have been introduced. In order to use such web based service, ActiveX control has been widely used.

The ActiveX control can be executable through a hyper text markup language (HTML) and a script language and access the resources of a client system, unlimitedly. Such an advantageous feature of the ActiveX control may cause the serious security problem in a client system if the ActiveX control contains malicious contents such as hacking codes.

Malicious users often use the weakness of the ActiveX control to illegally access a predetermined system. In this case, the malicious users use web-mails or home pages.

In case of the web-mails, a malicious user sends an E-mail to a predetermined person with contents that executes predetermined ActiveX control. When the predetermined person opens the E-mail, the malicious user can access the system illegally through the executed ActiveX control.

In case of the home page, a malicious user opens a home page with contents that execute predetermined ActiveX control. If any person visits the home page, the malicious user tries to access a related system illegally through the executed ActiveX control.

In order to overcome the shortcoming of the ActiveX control, the execution of ActiveX control has been restricted for interrupting the illegal access.

For example, Microsoft corp. introduced a SiteLock Template to limit domains that allow the execution of ActiveX control.

However, the SiteLock Template also has shortcoming. That is, a developer must code each ActiveX control with the SiteLock Template included. Due to such difficulty of using the SiteLock Template, only few developers use the SiteLock Template to limit the domains that allow the execution of ActiveX control.

Although the SiteLock Template is used, it is not easy to limit the domains if sites allowing the execution of ActiveX control are changeable.

For the reference, the Site Lock Template is described in detail in an article "Site Lock Template 1.04 for ActiveX control" in the Microsoft web-site.

SUMMARY OF THE INVENTION

Accordingly, the present invention is directed to an apparatus and method for managing the execution of ActiveX control, which substantially obviates one or more problems due to limitations and disadvantages of the related art.

It is an object of the present invention to provide a an apparatus and method for managing the execution of ActiveX control by allowing the execution of the ActiveX control within approved web sites and restricting the execution of the ActiveX control in disapproved web sites based on approved/disapproved server lists managed according to predetermined ActiveX control when a web browser tries to execute ActiveX control in a HTML document.

It is another object of the present invention to provide an apparatus and method for managing the execution of ActiveX control which allows the execution of ActiveX control only within a server having predetermined ActiveX control installed and approved servers for executing predetermined ActiveX control and restrict the execution of ActiveX control in disapproved servers based on approved/disapproved server lists managed according to predetermined ActiveX control, and enables a user to manually allow or restrict the execution of predetermined ActiveX control according to the user's decision if the allowance of the ActiveX control execution cannot be determined automatically.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided an apparatus for managing execution of ActiveX control including: a server list managing module for managing an approved server list for allowing the execution of predetermined ActiveX control and a disapproved server list for disallowing the execution of predetermined ActiveX control; an API hooking module for detecting installation or execution of ActiveX control in a HTML (Hyper Text Markup Language) document while visiting a web site; and a process module for reading the approved and disapproved server lists if the API hooking module detects the execution of the ActiveX control, allowing the execution of each ActiveX control only within approved web sites, and interrupting the execution of ActiveX control in disapproved web sites.

In another aspect of the present invention, there is provided a method for managing execution of ActiveX control including the steps of: a) detecting installation and execution of ActiveX control in a HTML (Hyper Text Markup Language) document while visiting a web site; b) reading approved and disapproved server lists for allowing or disallowing the execution of predetermined ActiveX control if the execution of ActiveX control is detected; and c) allowing the execution of the corresponding ActiveX control only within approved web sites and interrupting the execution of the corresponding ActiveX control in the disapproved web site according to the server lists.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention, are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
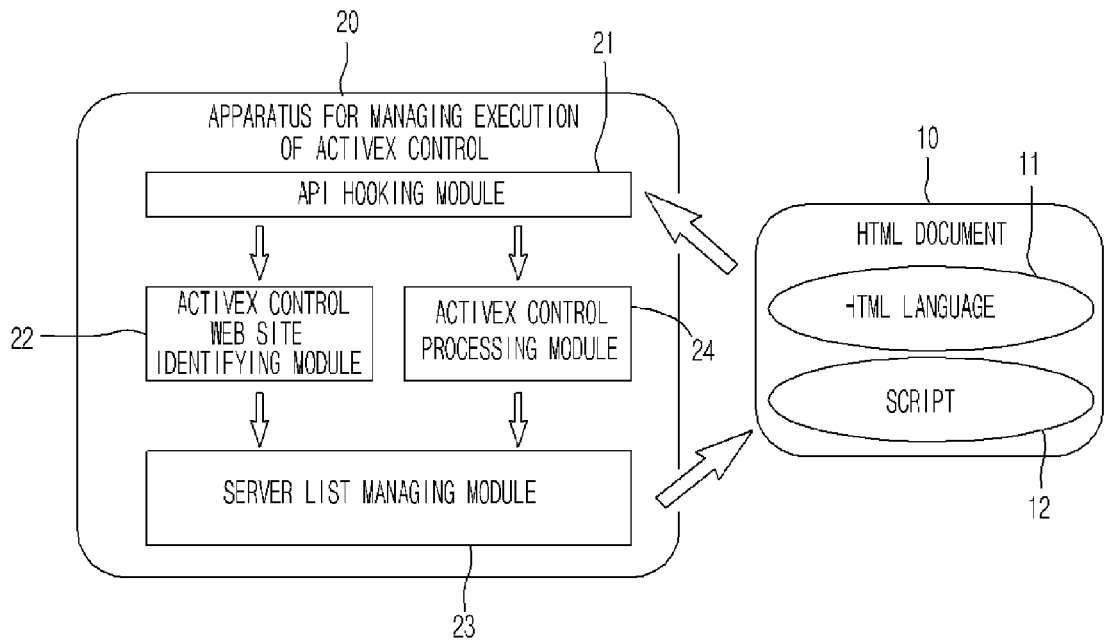
FIG. 1 is a block diagram illustrating an apparatus for managing the execution of ActiveX control according to an embodiment of the present invention.

FIG. 1 is a block diagram illustrating an apparatus for managing the execution of ActiveX control according to an embodiment of the present invention.

As shown in FIG. 1, the apparatus 20 for managing the execution of ActiveX control according to the present embodiment includes an API hooking module 21, a Web site identifying module 22, a server list managing module 23, and a process module 24. The apparatus 20 receives a hyper text markup language (HTML) document 10 from a predetermined server, and allows or disallows the execution of ActiveX control based on a previously stored list if a predetermined HTML 1 or a predetermined script 12 that request the installation of ActiveX control.

The API hooking module 21 detect ActiveX control installation or ActiveX execution by hooking application program interfaces (API) which are called from a web browser. The API hooking module 21 also obtains information about the ActiveX control installation or restricts the execution of the ActiveX control by performing other processes before a normal API is performed or by interrupting the execution of a normal API.

When the API hooking module 21 detects the ActiveX control installation, the Web site identifying module 22 identifies an uniform resource locator (URL) of a corresponding web site by reading a character string from a URL window of a web site having current ActiveX control.

The server list managing module 23 extracts a server address from the identified URL value from the Web site identifying module 22 and adds the extracted server address to the approved/disapproved server list for corresponding ActiveX control.

When the API hooking module 21 detects the execution of ActiveX control, the process module 24 reads the disapproved server list of a corresponding ActiveX control. If the currently accessing server is in the disapproved server list, the process module 24 interrupts the execution of the ActiveX control. If the currently accessing server is not in the disapproved server list, the process module 24 determines whether the currently accessing server is in the approved server list or not. If the currently accessing server is in the approved server list, the process module 24 allows the execution of the ActiveX control. If the currently accessing server is not in the approved/disapproved server list, a user determines whether the execution of corresponding ActiveX control is allowed or interrupted. Then, the process module 24 allows or interrupts the execution of corresponding ActiveX control according to a signal inputted from the user as a result of determination.

Figure 2:
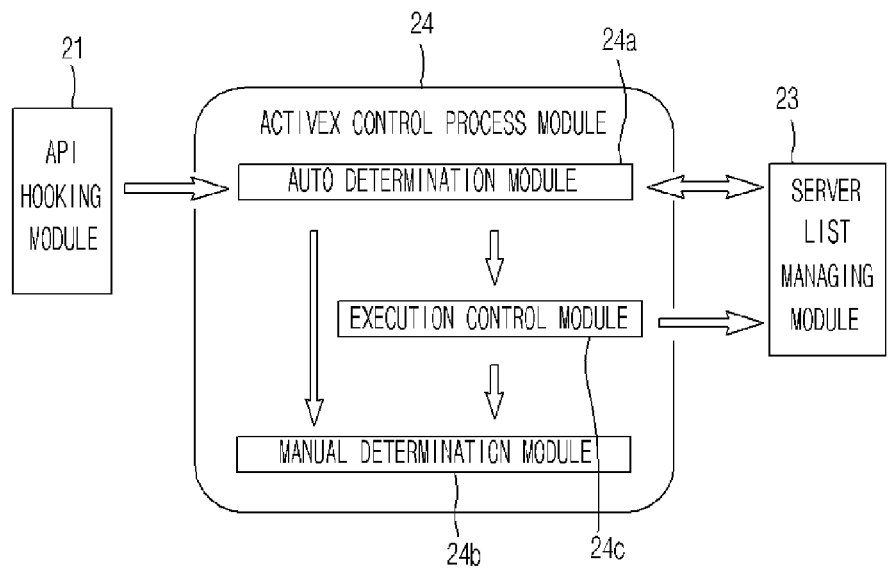
FIG. 2 is a block diagram illustrating a process module according to an embodiment of the present invention.

FIG. 2 is a block diagram illustrating a process module according to an embodiment of the present invention.

As shown in FIG. 2, the process module 24 includes an auto determination module 24A, an execution control module 24B, and a manual determination module 24C.

When the API hooking module 21 detects the execution of ActiveX control, the auto determination module 24A reads the approved/disapproved server lists for corresponding ActiveX control. Based on the approved/disapproved server lists, the auto determination module 24A determines whether the currently accessing server is in the disapproved server list or the approved server list. Based on the determination result, the auto determination module 24A selects one of control schemes for automatically allowing the execution of corresponding ActiveX control, automatically interrupting the execution of corresponding ActiveX control, manually allowing the execution of corresponding ActiveX control, and manually intercepting corresponding ActiveX control.

The execution control module 24B of the process module 24 determines whether the currently accessing server is in the approved/disapproved server lists for the corresponding ActiveX control based on the determination result of the auto determination module 24A. If the currently accessing server is in the disapproved server list, the execution control module 24B automatically interrupts the execution of the corresponding ActiveX control. If the currently accessing server is in the approved server list, the execution control module 24B allows the execution of the corresponding ActiveX control.

The execution manual determination module 24C of the process module 24 enables a user to allow or to intercept the execution of the corresponding ActiveX control if the currently accessing server is not in the approved/disapproved server lists based on the determination result of the auto determination module 24A. And, the manual determination module 24C allows or intercepts the execution of the corresponding ActiveX control according to a signal inputted by the user based on the determination result.

Hereinafter, a method of managing the execution of ActiveX control according to an embodiment of the present invention will be described with reference to FIG. 3.

Figure 3:
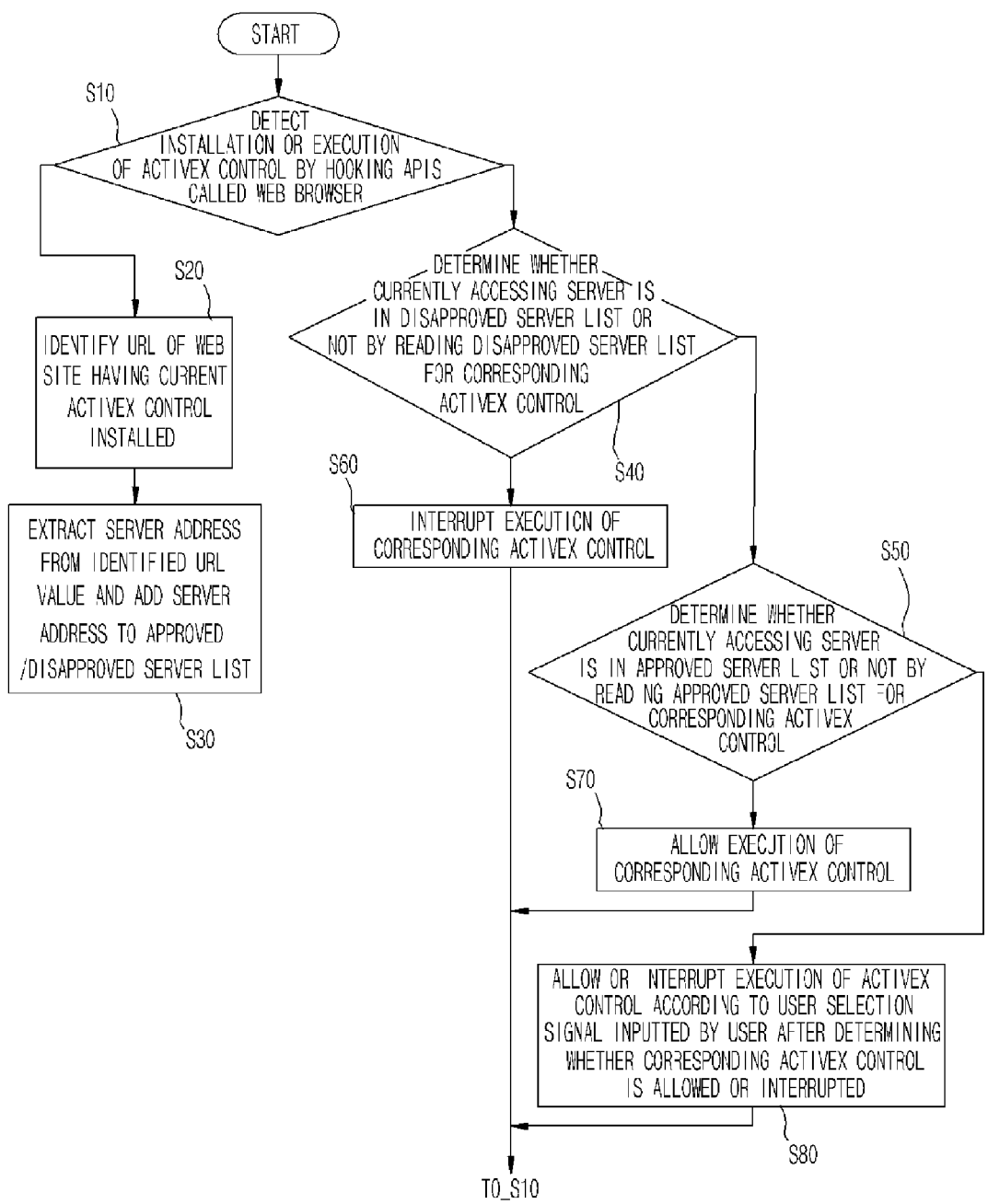
FIG. 3 is a flowchart illustrating a method of managing the execution of ActiveX control according to an embodiment of the present invention.

FIG. 3 is a flowchart illustrating a method of managing the execution of ActiveX control according to an embodiment of the present invention.

Referring to FIG. 3, at step S10, the API hooking module 21 detects the installation or the execution of ActiveX control by hooking APIs that are called by a web browser. Also, the API hooking module 21 obtains information about the installation of ActiveX control or controls the execution of ActiveX control by performing other processes before a normal API is performed and intercepting the execution of API.

The API hooking scheme in the API hooking module 21 is a technology for calling the other functions instead of calling a target function when a predetermined program calls the target function. In the present embodiment, the execution of the ActiveX control can be allowed or interrupted by calling the other functions when a web browser calls a target function which is a necessary function for executing the corresponding ActiveX control.

In the present embodiment, the API hooking scheme can be embodied through various methods as follows.

The first API hooking method changes the DLL file of a target function to totally different DLL file in order to call the other function instead of calling the target function.

The first API hooking method is widely known as a proxy DLL scheme, which is introduced in an article "Under the Hood" by Matt Pietrek in Microsoft System Journal, September, 1997.

The second API hooking method modifies an import address table.

The execution file of the second API method includes a section ".idata" having an import address table for external function. In order to call external functions in the execution file, the import address table is referred. In the second API hooking method, the import address table is modified to call the other function instead of calling the target function.

The second API hooking method for modifying the import address table was introduced in an article "Windows 95 system programming secrets" by Matt Pietrek, and an article APISPY32 by Matt Pietrek. Also, the second API hooking method was introduced in an article "Spying on COM Objects" by Dmitri Leman, "Windows Developer Journal" July, 1999. Furthermore, the second API hooking method was introduced in documents that contain the related information from "Windows Developer Journal" and "Dr. Dobb's Journal".

The third API hooking method modifies an API itself. That is, the third API hooking method modifies the beginning part of a target function to call the other function instead of calling the target function. The third API hooking method may be "Detours" provided from Microsoft Research. The third API hooking method was introduced in "Detours: Binary Interception of Win32 Functions" by Galen Hunt and Doug Brubacher in USENIZX July. 1999.

In the present embodiment, the apparatus for managing the execution of ActiveX control can provide the same effect using one of the three well-known API hooking methods. Also, the apparatus for managing the execution of ActiveX control may provide the same effect using any other API hooking method that can call the other functions instead of calling a target function.

As described above, the two important functions of the API hooking module 21 are to detect the installation of ActiveX control and to detect the execution of ActiveX control.

The installation of ActiveX control can be detected as follows.

The installation of new ActiveX control can be detected by detecting the calling of DllRegisterServer in each of ActiveX control files. However, it is not effective method. Since DllRegisterServer is an API included in all ActiveX control, the hooking of DllRegisterServer may abruptly increase functions to hook. Therefore, it is prefer to use a following method to detect the installation of ActiveX control while a hooking operation is effectively performed.

When the ActiveX control is installed at a system, the ActiveX control must generate a key with own class ID at a lower level of HKEY_CLASSES_ROOT\CLSID\, which is one of window registry management directories.

Herein, HKEY_CLASSES_ROOT is identical to HKEY_LOCAL_MACHINE\Software\Classes.

Therefore, the installation of new ActiveX control can be detected by detecting the generation of a Key with a predetermined Class ID at the lower level of HKEY_CLASSES_ROOT\CLSID. It can be detected by monitoring the tries of generating a Key in registries. In order to monitor, it needs to hook a registry related APIs.

The necessary registry related APIs to took are RegOpenKeyExA, RegOpenKeyExW, RegCreateKeyExA, and RegCreateKeyExW. Hereinafter, RegOpenKeyEx is used to refer both of RegOpenKeyExA and RegOpenKeyExW, and RegCreateKeyEx is used to refer both of RegCreateKeyExA and RegCreateKeyExW.

The four registry related APIs can be defined as follows.

```
LONG RegCreateKeyExA(HKEY hKey,
    LPCSTR lpSubKey,
    DWORD Reserved,
    LPSTR lpClass,
    DWORD dwOptions,
    REGSAM samDesired,
    LPSECURITY_ATTRIBUTES lpSecurityAttributes,
    PHKEY phkResult,
    LPDWORD lpdwDisposition);
LONG RegCreateKeyExW(HKEY hKey,
    LPCWSTR lpSubKey,
    DWORD Reserved,
    LPWSTR lpClass,
    DWORD dwOptions,
    REGSAM samDesired,
    LPSECURITY_ATTRIBUTES lpSecurityAttributes,
    PHKEY phkResult,
    LPDWORD lpdwDisposition);
LONG RegOpenKeyExA(HKEY hKey,
    LPCSTR lpSubKey,
    DWORD ulOptions,
    REGSAM samDesired,
    PHKEY phkResult);
LONG RegOpenKeyExW(HKEY hKey,
    LPCWSTR lpSubKey,
    DWORD ulOptions,
    REGSAM samDesired,
    PHKEY phkResult);
```

In order to monitor and detect the installation of ActiveX control, RegOpenKeyEx must be hooked with RegCreateKeyEx that is a registry key generation function for generating a registry key as described above. It because that a registry key may be generated by calling RegCreateKeyEx using a previously existing registry key that is opened using RegOpenKeyEx.

In order to monitor whether a registry key is generated at the lower level of HKEY_CLASSES_ROOT\CLSID, it is insufficient to monitor HKEY_CLASSES_ROOT as a first parameter HKEY value by hooking RegCreateKeyEx, and to monitor a character string beginning with "CLSID\" and having a predetermined CLSID as a second LPCSTR value.

A new key is generated at the lower level of HKEY_CLASSES_ROOT\CLSID when RegOpenKeyEx opens a HKEY_CLASSES_ROOT\CLSID key, a returned HKEY value therefrom is transferred as the first parameter of RegCreateKeyEx, and a character string having a predetermined CLSID inputs as a second parameter. The above method cannot detect the key generation in this case. Therefore, it must detect the tries of opening HKEY_CLASSES_ROOT or HKEY_CLASSES_ROOT\CLSID through hooking the RegOpenKeyEx and store a PHKEY value that is the last parameter after RegOpenKeyExA and RegOpenKeyExW are successfully performed. Then, if the stored PHKEY value inputs as the first parameter of RegCreateKeyEx later, it must be detected as the try of generating a predetermined CLSID at the lower level of HKEY_CLASSES_ROOT\CLSID.

Similar cases for trying installation of new ActiveX control will be described as follows. The installation of new ActiveX control can be detected when following cases are detected.

1) when HKEY_CLASSES_ROOT is inputted as the first parameter of RegCreateKeyEx, and a character string beginning with "CLSID\" is inputted as the second parameter.

2) when HKEY_LOCAL_MACHINE is inputted as the first parameter of RegCreateKeyEx and a character string beginning with "Software\Classes\CLSID\" is inputted as the second parameter.

3) when HKEY_CLASSES_ROOT is inputted as the first parameter of RegCreateKeyEx, a related operation is normally performed by inputting NULL as the second parameter, a PHKEY value is inputted as eighth parameter as the first parameter of RegCreateKeyEx again, and a character string beginning with "CLSID\" is inputted as the second parameter.

4) when HKEY_CLASSES_ROOT is inputted as the first parameter of RegCreateKeyEx, a related operation is normally performed by "CLSID" inputted as the second parameter, a PHKEY value, the eighth parameter, is inputted as the first parameter of RegCreateKeyEx again, and a character string not NULL is inputted as the second parameter.

5) when HKEY_LOCAL_MACHINE is inputted as the first parameter of RegCreateKeyEx, a related operation is normally performed by "NULL" inputted as the second parameter, a PHKEY value, the eighth parameter, is inputted as the first parameter of RegCreateKeyEx again, and a character string beginning with "Software\Classes\CLSID\" is inputted as the second parameter.

6) when HKEY_LOCAL_MACHINE is inputted as the first parameter of RegCreateKeyEx, a related operation is normally performed by inputting "Software" as the second parameter, a PHKEY value, the eighth parameter, is inputted as the first parameter of RegCreateKeyEx again, and a character string beginning with "Classes\CLSID\" is inputted as the second parameter.

7) when HKEY_LOCAL_MACHINE is inputted as the first parameter of RegCreateKeyEx, a related operation is performed normally by inputting "Software\Classes" as the second parameter, a PHKEY value, the eighth parameter, is inputted as the first parameter of RegCreateKeyEx again, and a character string beginning with "CLSID\" is inputted as the second parameter.

8) when HKEY_LOCAL_MACHINE is inputted as the first parameter of RegCreateKeyEx, a related operation is performed normally by inputting "Software\Classes\CLSID" as the second parameter, a PHKEY value, the eighth parameter, is inputted as the first parameter of RegCreateKeyEx again, and a character string not "NULL" is inputted as the second parameter.

9) when HKEY_CLASSES_ROOT is inputted as the first parameter of RegOpenKeyEx, a related operation is performed normally by inputting NULL as the second parameter, a PHKEY value, the fifth parameter, is inputted as the first parameter of RegCreateKeyEx again, and a character string beginning with "CLSID\" is inputted as the second parameter.

10) when HKEY_CLASSES_ROOT is inputted as the first parameter of RegOpenKeyEx, a related operation is performed normally by inputting "CLSID" as the second parameter, a PHKEY value, the fifth parameter, is inputted as the first parameter of RegCreateKeyEx again, and a character string not NULL is inputted as the second parameter.

11) when HKEY_LOCAL_MACHINE is inputted as the first parameter of RegOpenKeyEx, a related operation is performed normally by inputting "NULL" as the second parameter, a PHKEY value, the fifth parameter, is inputted as the first parameter of RegCreateKeyEx again, and a character string beginning with "Software\Classes\CLSID\" is inputted as the second parameter.

12) when HKEY_LOCAL_MACHINE is inputted as the first parameter of RegOpenKeyEx, a related operation is performed normally by inputting "Software" as the second parameter, a PHKEY value, the fifth parameter, is inputted as the first parameter of RegCreateKeyEx again, and a character string beginning with "Classes\CLSID\" is inputted as the second parameter.

13) when HKEY_LOCAL_MACHINE is inputted as the first parameter of RegOpenKeyEx, a related operation is performed normally by inputting "Software\Classes" as the second parameter, a PHKEY value, the fifth parameter, is inputted as the first parameter of RegCreateKeyEx again, and a character string beginning with "CLSID\" is inputted as the second parameter.

14) when HKEY_LOCAL_MACHINE is inputted as the first parameter of RegOpenKeyEx, a related operation is performed normally by inputting "Software\Classes\CLSID" as the second parameter, a PHKEY value, the fifth parameter, is inputted as the first parameter of RegCreateKeyEx again, and a character string not NULL is inputted as the second parameter.

By detecting one of the fourteen cases, The API hooking module 21 can detect the installation of ActiveX control. The API hooking module 21 also detects the execution of ActiveX control using two following methods.

The first method detect the execution of ActiveX control by detecting the calling of an IClassFactory::CoCreateInstance interface, which is included in every ActiveX control and is an essential function for executing ActiveX control. The first method has a disadvantage of hooking all of corresponding interfaces because every ActiveX control include the ICassFactory::CoCreateInstance interface.

In order to effectively detect the execution of ActiveX control, it is prefer to hook a system API such as CoGetClassObject. In general, a COM API, CoCreateInstance, is used to perform COM. In CoCreateInstance, a CoGetClassObject is called again.

Since a developer can directly call the CoGetClassObject, it is the most reliable method for detecting the execution of COM to hook the CoGetClassObject.

Since ActiveX control is based on COM, the execution of ActiveX control is equivalent to the execution of COM. Therefore, the execution of the ActiveX control can be detected by detecting the execution of COM.

After the execution of COM is detected by hooking the CoGetClassObject, the API holing module determines whether the corresponding COM is ActiveX or not. The CoGetClassObject does not generate COM. The CoGetClassObject generates IClassFactory that can generate COM and the point of the generated IClassFactory is provided to a user.

Therefore, a user uses the provided pointer to generate COM. In order to generate COM, IClassFactory::CreateInstance is executed. By doing so, the real COM is generated, and an IUnknown pointer is provided to use the COM. After the IUnknown pointer is obtained, it is determined whether an IDispatch[Ex] interface and IPersistPropertyBag[2] exist or not in order to determine whether a corresponding COM is ActiveX Control or not. In order to determine, IUnknown::QueryInterface can be used. If the IDispatch[Ex] interface or the IPersistPropertyBag[2] is present, the corresponding COM is determined as ActiveX control. In case of the ActiveX control, it is required to determine whether the execution of corresponding ActiveX control is allowed or not. If it is COM, the API hooking module 21 stops hooking and allows related operations to perform COM, normally.

As described above, the API hooking module 21 detects the installation or the execution of corresponding ActiveX control by hooking APIs called by a web browser. For example, a web browser receives a HTML document 10 from a predetermined web server and decodes a HTML code 11 or a script 12 that requests ActiveX control installation. Then, the API hooking module 21 determines whether it is the installation ActiveX control or the execution of ActiveX control by hooking related APIs. If the API hooking module 21 detects the ActiveX control installation, the web site identifying module 22 identifies the URL of a corresponding web site by reading a character string from the URL window of the web site where the ActiveX control is installed at step S20.

Generally, the URL window is an edit box window. The character string of the URL window can be read by sending a message such as WM_GETTEXT to the edit box window. The URL can be identified through various methods provided from a web browser.

The identified URL value is transferred to the server list managing module 23. The server list managing module 23 extracts a server address from the identified URL value and adds an installation server address into the approved/disapproved server list of corresponding ActiveX control at step S30. One pair of approved/disapproved server lists is provided per each ActiveX control.

After the installation server address is added into the approved/disapproved server list of the corresponding ActiveX control, the API hooking module 21 detects the installation or the execution of corresponding ActiveX control by hooking APIs called by a web browser. For example, a web browser receives a HTML document 10 from a predetermined web server and decodes a HTML code 11 or a script 12 that requests ActiveX control installation. Then, the API hooking module 21 determines whether it is the installation of the ActiveX control or the execution of ActiveX control by hooking related APIs. If the API hooking module 21 detects the ActiveX control execution, the process module 24 reads the approved/disapproved server list for the corresponding ActiveX control and determines whether the currently accessing server is in the approved/disapproved server list or not at steps S40 and S50. Then, the execution of corresponding ActiveX control is allowed or interrupted as follows.

When the API hooking module 21 detects the execution of ActiveX control, the auto determination module 24A of the process module 24 reads the approved/disapproved server lists for corresponding ActiveX control. Based on the approved/disapproved server lists, the auto determination module 24A determines whether the currently accessing server is in the disapproved server list or the approved server list. Based on the determination result, the auto determination module 24A selects one of control schemes for automatically allowing the execution of corresponding ActiveX control, automatically interrupting the execution of corresponding ActiveX control, manually allowing the execution of corresponding ActiveX control, and manually intercepting corresponding ActiveX control. The process module 24 determines whether the currently accessing server is included in a disapproved server list or not at step S40. If the corresponding ActiveX control is not in the disapproved server list, the process module 24 determines whether the currently accessing server is included in an approved server list or not at step S50.

The execution control module 24B of the process module 24 interrupts the execution of the corresponding ActiveX control at step S60 if the currently accessing server is in the disapproved server list for the corresponding ActiveX control. The execution control module 24B allows the execution of the corresponding ActiveX control at step S70 if the currently accessing server is in the approved server list for the corresponding ActiveX control.

As a method of interrupting the execution of ActiveX control in the execution control module 24B, for example, the execution control module 24B inputs a value identical to an E_NOINTERFACE value into a return value such as the HRESULT of CoGetClassObject, and invalidates the pointer of IClassFactory provided by CoGetClassObject using NULL. The E_NOINTERFACE value denotes that a related operation is not normally performed.

On the other hand, the auto determination module 24A determines whether the currently accessing server is in the disapproved server list or the approved server list by reading the approved/disapproved server list for the corresponding ActiveX control at steps S40 and S50. If the currently accessing server is not in the approved/disapproved server list for the corresponding ActiveX control, the auto determination module 24A ends its operation and the manual determination module 24C enables a user to determine whether the execution of the corresponding Active X control is allowed or not. According to the user input, the execution of the ActiveX control is allowed or interrupted at step S80.

In this case, the manual determination module 24C displays a pop-up window that asks a user to allow or to disallow the execution of the corresponding ActiveX control. The pop-up window may include two buttons for allowing or disallowing the execution of the corresponding ActiveX control and a check box for continuously applying the corresponding selection.

If a user selects a check box for confirming not continuously applying the corresponding selection and selects one of the allowing and disallowing buttons, the manual determination module 24C ends its operation and the execution control module 24B allows or interrupts the execution of the ActiveX control.

On the contrary, if a user selects a check box for confirming continuously applying a current selection, and selects one of the allowing and disallowing buttons, the manual determination module 24C ends its operation and the server list managing module 23 is operated before the execution control module 24B. The server list managing module 23 stores a currently accessing server in the approved/disapproved server lists, and the execution control module 24B interrupts or allows the execution of the ActiveX control.

As described above, the apparatus and method for managing the execution of ActiveX control according to the present embodiment can restrict the installation and the execution of the malicious ActiveX control by detecting the installation and the execution of ActiveX control. Also, after a malicious ActiveX control list is stored, the apparatus and method for managing the execution of ActiveX control according to the present embodiment can interrupt the installation of corresponding ActiveX control at a time of installing the corresponding ActiveX control if the corresponding ActiveX control is in the malicious ActiveX control list. Furthermore, the apparatus and method for managing the execution of ActiveX control according to the present embodiment can interrupt the execution of corresponding ActiveX control at a time of executing the corresponding ActiveX control if the corresponding ActiveX control is in the malicious ActiveX control list.

It will be apparent to those skilled in the art that various modifications and variations can be made in the present invention. Thus, it is intended that the present invention covers the modifications and variations of this invention provided they come within the scope of the appended claims and their equivalents.

As described above, the apparatus and method for managing the execution of ActiveX control according to the present invention can prevent ActiveX control from being executed in a predetermined server and controls the ActiveX control to be executed in authenticated servers only. For example, if a malicious web page that illegally uses ActiveX control installed at authenticated server (Good server) is loaded on a bad server and a user opens the malicious web page, the execution of corresponding ActiveX control can be interrupted. Therefore, the user's systems can be safely protected.

What is claimed is:

1. An apparatus comprising:
   a processor storing processor executable component including:
   a server list managing module for managing an approved server list for allowing the execution of predetermined ActiveX control and a disapproved server list for disallowing the execution of predetermined ActiveX control;
   an API hooking module, for detecting installation or execution of ActiveX control in a HTML (Hyper Text Markup Language) document while visiting a web site;
   a web site identifying module for identifying a URL (uniform resource locator) of the web site and transferring the identified URL to the server list managing module for addition to at least one of the approved server list or the disapproved server list if the API hooking module detects the installation of current ActiveX control on the web site; and
   a process module for reading the approved and disapproved server lists if the API hooking module detects the execution of the ActiveX control, allowing the execution of each ActiveX control only within approved web sites, and interrupting the execution of ActiveX control in disapproved web sites,
   wherein the server list managing module extracts a server address from the identified URL value from the Web site identifying module and adds the extracted server address to the approved/disapproved server list for corresponding ActiveX control,
   wherein the web site identifying module is configured to read a character string in the URL (uniform resource locator) of the web site to identify the URL, and
   wherein the process module includes:
      an auto determination module for reading a server list for corresponding ActiveX control, determining whether a currently accessing server is allowed or disallowed based on the read server list, and deciding one of control schemes for automatically allowing the execution of corresponding ActiveX control, automatically interrupting the execution of corresponding ActiveX control, manually allowing the execution of corresponding ActiveX control, and manually intercepting corresponding ActiveX control when the API hooking module detects the execution of ActiveX control;
      an execution control module for interrupting the execution of the corresponding Active X control if the corresponding ActiveX control is disallowed or allowing the execution of the corresponding ActiveX control if the corresponding ActiveX control is allowed according to the determination result of the auto determination module; and
      a manual determination module for interrupting or allowing the execution of the corresponding ActiveX control according to a user selection signal if the corresponding ActiveX control accesses a server not in the server list according to the determination result of the auto determination module,
      wherein the identified URL value is transferred to the server list managing module, and the server list managing module extracts a server address from the identified URL value and adds an installation server address into the approved/disapproved server list providing one pair thereof per each ActiveX control, of corresponding ActiveX control.

2. The apparatus of claim 1, wherein the API hooking module is configured to detect the installation of an ActiveX control by detecting the generation of a predetermined key with a predetermined Class ID at a predetermined level of a system registry.

3. The apparatus of claim 1, wherein the API hooking module is configured to detect the execution of an ActiveX control by detecting the calling of a particular API (Application Programming Interface) that is included in an ActiveX control.

4. The apparatus of claim 1, wherein the API hooking module detects the execution of an ActiveX control by detecting the calling of a particular API (Application Programming Interface) that generates a COM (Component Object Model) object, detecting the execution of the generated COM object, and then determining whether the generated COM object is an ActiveX control.

5. A method for managing execution of ActiveX control comprising the steps of:
   a) detecting one of installation or execution of ActiveX control in a HTML (Hyper Text Markup Language) document while visiting a web site;
   a-1) based on detecting installation, adding a server address to at least one of an approved server list or a disapproved server list;
   b) based on detecting execution, reading approved and disapproved server lists for allowing or disallowing the execution of predetermined ActiveX control if the execution of ActiveX control is detected; and
   c) allowing the execution of the corresponding ActiveX control only within approved web sites and interrupting the execution of the corresponding ActiveX control in the disapproved web site according to the server lists;
   wherein (a-1) includes
      identifying a URL (uniform resource locator) of the web site by reading a character string in the URL and transferring the identified URL to a server list managing module for addition to at least one of the approved server list or the disapproved server list if an API hooking module detects installation of current ActiveX control on the web site; and
      extracting a server address from the identified URL value of the web site and adding the extracted server address to the approved/disapproved server list for corresponding ActiveX control;
   wherein (c) includes
      deciding one of control schemes for automatically allowing execution of corresponding ActiveX control, automatically interrupting the execution of corresponding ActiveX control, manually allowing the execution of corresponding ActiveX control, and manually intercepting corresponding ActiveX control when the execution of corresponding ActiveX control is detected;
      interrupting the execution of the corresponding Active X control if the corresponding ActiveX control is disallowed or allowing the execution of the corresponding ActiveX control if the corresponding ActiveX control is allowed; and
      interrupting or allowing the execution of the corresponding ActiveX control according to a user selection signal if the corresponding ActiveX control accesses a server not in the approved or disapproved server; and
      wherein the identified URL value is transferred to the server list managing module, and the server list managing module extracts a server address from the identified URL value and adds an installation server address into the approved/disapproved server list providing one pair thereof per each ActiveX control, of corresponding ActiveX control.

6. The method of claim 5, before the step a), further comprising the step of d) composing an approved server list for allowing the execution of the predetermined ActiveX control and a disapproved server list for interrupting the execution of the predetermined ActiveX control.

7. The method of claim 5, wherein the step of detecting installation or execution of ActiveX control includes the step of detecting the installation of an ActiveX control by detecting the generation of a predetermined key with a predetermined Class ID at a predetermined level of a system registry.

8. The method of claim 5, wherein the step of detecting installation or execution of ActiveX control includes the step of detecting the execution of an ActiveX control by detecting the calling of a particular API (Application Programming Interface) that is included in an ActiveX control.

9. The method of claim 5, wherein the step of detecting installation or execution of ActiveX control includes the step of detecting the execution of an ActiveX control by detecting the calling of a particular API (Application Programming Interface) that generates a COM (Component Object Model) object, detecting the execution of the generated COM object, and then determining whether the generated COM object is an ActiveX control.

* * * * *